(12) United States Patent
Yasuda et al.

(10) Patent No.: US 10,423,930 B2
(45) Date of Patent: Sep. 24, 2019

(54) SCHEDULE MANAGEMENT SYSTEM, NON-TRANSITORY COMPUTER READABLE MEDIUM, AND SCHEDULE MANAGEMENT METHOD

(71) Applicant: FUJI XEROX CO., LTD., Tokyo (JP)

(72) Inventors: Shunichi Yasuda, Kanagawa (JP); Kengo Tokuchi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 407 days.

(21) Appl. No.: 14/919,222

(22) Filed: Oct. 21, 2015

(65) Prior Publication Data

US 2016/0342952 A1  Nov. 24, 2016

(30) Foreign Application Priority Data

May 21, 2015 (JP) ................. 2015-103409

(51) Int. Cl.
*G06Q 10/10* (2012.01)

(52) U.S. Cl.
CPC ............... *G06Q 10/1095* (2013.01)

(58) Field of Classification Search
CPC ................................... G06Q 10/10
See application file for complete search history.

(56) References Cited

U.S. PATENT DOCUMENTS

| 8,090,707 | B1* | 1/2012 | Orttung | G06Q 10/025 705/319 |
| 8,121,953 | B1* | 2/2012 | Orttung | G06Q 10/1095 705/35 |
| 8,180,663 | B2* | 5/2012 | Tischhauser | G06Q 10/06314 705/7.19 |
| 2006/0106655 | A1* | 5/2006 | Lettovsky | G06Q 10/02 705/6 |
| 2008/0059256 | A1* | 3/2008 | Lynch | G06Q 10/063 705/7.24 |

(Continued)

FOREIGN PATENT DOCUMENTS

| CN | 101369324 A | 2/2009 |
| CN | 103218709 A | 7/2013 |

(Continued)

OTHER PUBLICATIONS

Jan. 4, 2019 Office Action issued in Chinese Patent Application No. 201510895427.7.

(Continued)

*Primary Examiner* — Kurtis Gills
(74) *Attorney, Agent, or Firm* — Oliff PLC (57) ABSTRACT

A schedule management apparatus includes a schedule information receiving unit that receives schedule information generated by one or more client devices from each of the client devices, the schedule information including a description of an event, a location of the event, and a date/time of the event. On the basis of the schedule information received by the schedule information receiving unit, information is displayed on each of the client devices about an event to be newly added that matches the schedule information without overlapping with a date/time of each of events scheduled before and after the event, the information representing at least one of a duration of the event, a location of the event, and a route to the event.

8 Claims, 10 Drawing Sheets

(56) References Cited

U.S. PATENT DOCUMENTS

| | | | |
|---|---|---|---|
| 2009/0048893 A1 | 2/2009 | Wang et al. | |
| 2010/0228577 A1* | 9/2010 | Cunningham | G06Q 10/02 |
| | | | 705/5 |
| 2011/0040588 A1* | 2/2011 | Durocher | G06Q 10/06 |
| | | | 705/7.35 |
| 2011/0040591 A1* | 2/2011 | Durocher | G06Q 10/06375 |
| | | | 705/7.35 |
| 2015/0032484 A1* | 1/2015 | Mermelstein | G06Q 10/02 |
| | | | 705/5 |
| 2015/0112738 A1* | 4/2015 | Marinaro | G06Q 10/02 |
| | | | 705/5 |
| 2016/0094938 A1* | 3/2016 | Upadhyaya | H04W 4/02 |
| | | | 455/456.3 |

FOREIGN PATENT DOCUMENTS

| | | |
|---|---|---|
| JP | 2002-150178 A | 5/2002 |
| JP | 2004-062740 A | 2/2004 |
| JP | 2008-269480 A | 11/2008 |
| JP | 2009-043164 A | 2/2009 |
| JP | 2010-191812 A | 9/2010 |

OTHER PUBLICATIONS

Feb. 26, 2019 Office Action issued in Japanese Patent Application No. 2015-103409.
Jul. 2, 2019 Office Action issued in Chinese Patent Application No. 201510895427.7.

\* cited by examiner

SCHEDULE MANAGEMENT SYSTEM, NON-TRANSITORY COMPUTER READABLE MEDIUM, AND SCHEDULE MANAGEMENT METHOD

CROSS-REFERENCE TO RELATED APPLICATIONS

This application is based on and claims priority under 35 USC 119 from Japanese Patent Application No. 2015-103409 filed May 21, 2015.

BACKGROUND

Technical Field

The present invention relates to a schedule management system, a non-transitory computer readable medium, and a schedule management method.

SUMMARY

According to an aspect of the invention, there is provided a schedule management apparatus including a schedule information receiving unit that receives schedule information generated by one or more client devices from each of the client devices, the schedule information including a description of an event, a location of the event, and a date/time of the event, in which on the basis of the schedule information received by the schedule information receiving unit, information is displayed on each of the client devices about an event to be newly added that matches the schedule information without overlapping with a date/time of each of events scheduled before and after the event, the information representing at least one of a duration of the event, a location of the event, and a route to the event.

BRIEF DESCRIPTION OF THE DRAWINGS

Exemplary embodiments of the present invention are described in detail based on the following figures, wherein.

DETAILED DESCRIPTION

Although the present invention is described below by way of its exemplary embodiments and specific examples with reference to the figures, the present invention is not limited to these exemplary embodiments and specific examples.

It is to be noted that in the following discussion using the figures, the figures are schematic only, and the relative proportions of various dimensions may differ from the actuality. Further, for the ease of understanding, components other than those necessary for explanation are omitted as appropriate.

Figure 1:
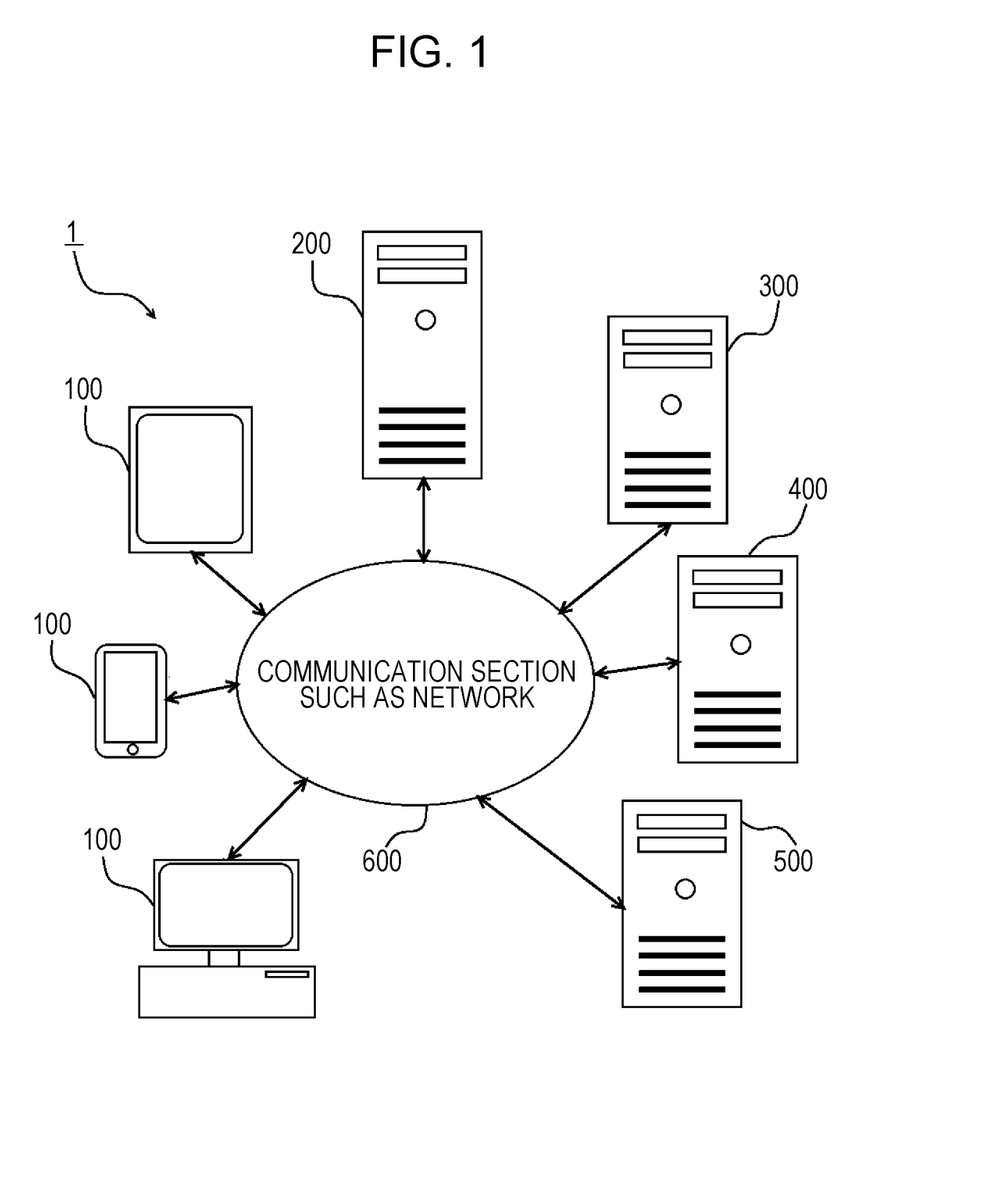
FIG. 1 illustrates a general configuration of a schedule management system.
Figure 2A:
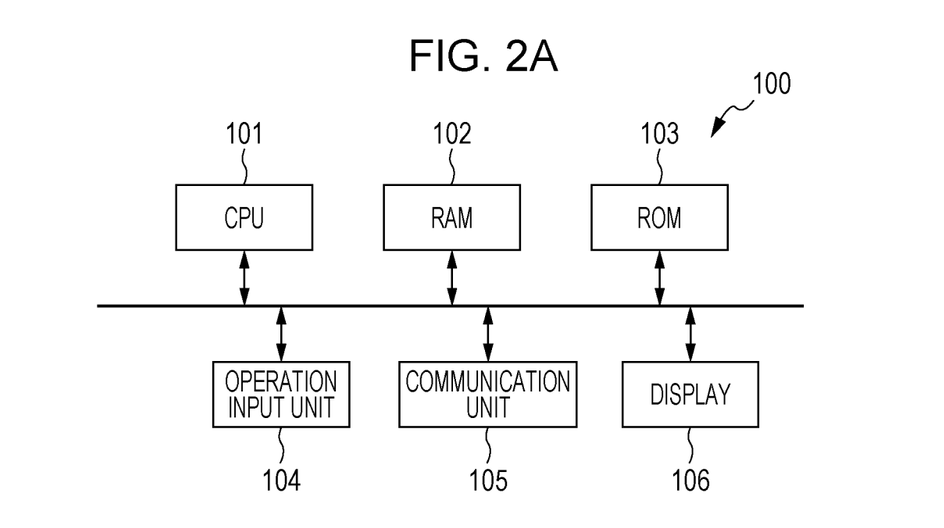
FIG. 2A is a block diagram illustrating a hardware configuration of a client device.
Figure 2B:
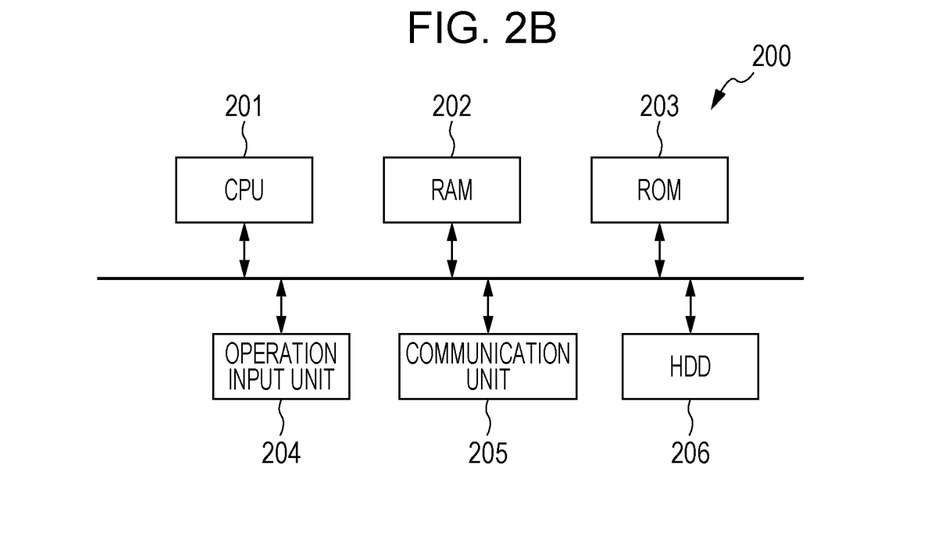
FIG. 2B is a block diagram illustrating a hardware configuration of a schedule management server apparatus.

First Exemplary Embodiment (1) General Configuration of Schedule Management System FIG. 1 illustrates a general configuration of a schedule management system 1 according to a first exemplary embodiment. FIG. 2A is a block diagram illustrating a hardware configuration of a client device 100, and FIG. 2B is a block diagram illustrating a hardware configuration of a schedule management server apparatus 200.

Hereinafter, a general configuration of the schedule management system 1 is described with reference to the figures.

As illustrated in FIG. 1, the schedule management system 1 includes multiple client devices 100, the schedule management server apparatus 200, a property search server 300, an address search server 400, and a station-to-station search server 500. The client devices 100, the schedule management server apparatus 200, the property search server 300, the address search server 400, and the station-to-station search server 500 are connected to a network 600 such as the Internet or wide area network (WAN) so as to be able to communicate with each other.

As illustrated in FIG. 2A, the client device 100 has components such as a central processing unit (CPU) 101, a random access memory (RAM) 102, a read only memory (ROM) 103, an operation input unit 104, a communication unit 105, and a display 106. The client device 100 may be, for example, a portable electronic device such as a cellular phone, a PDA terminal, a smart phone, or a notebook PC, or a stationary electronic device such as a desktop PC.

As illustrated in FIG. 2B, the schedule management server apparatus 200 has components such as a CPU 201, a RAM 202, a ROM 203, an operation input unit 204, a communication unit 205, and a hard disk drive (HDD) 206. Although the schedule management server apparatus 200 is a stationary PC or the like, the schedule management server apparatus 200 may be another electronic device.

(2) Functional Configuration of Schedule Management System

Figure 3:
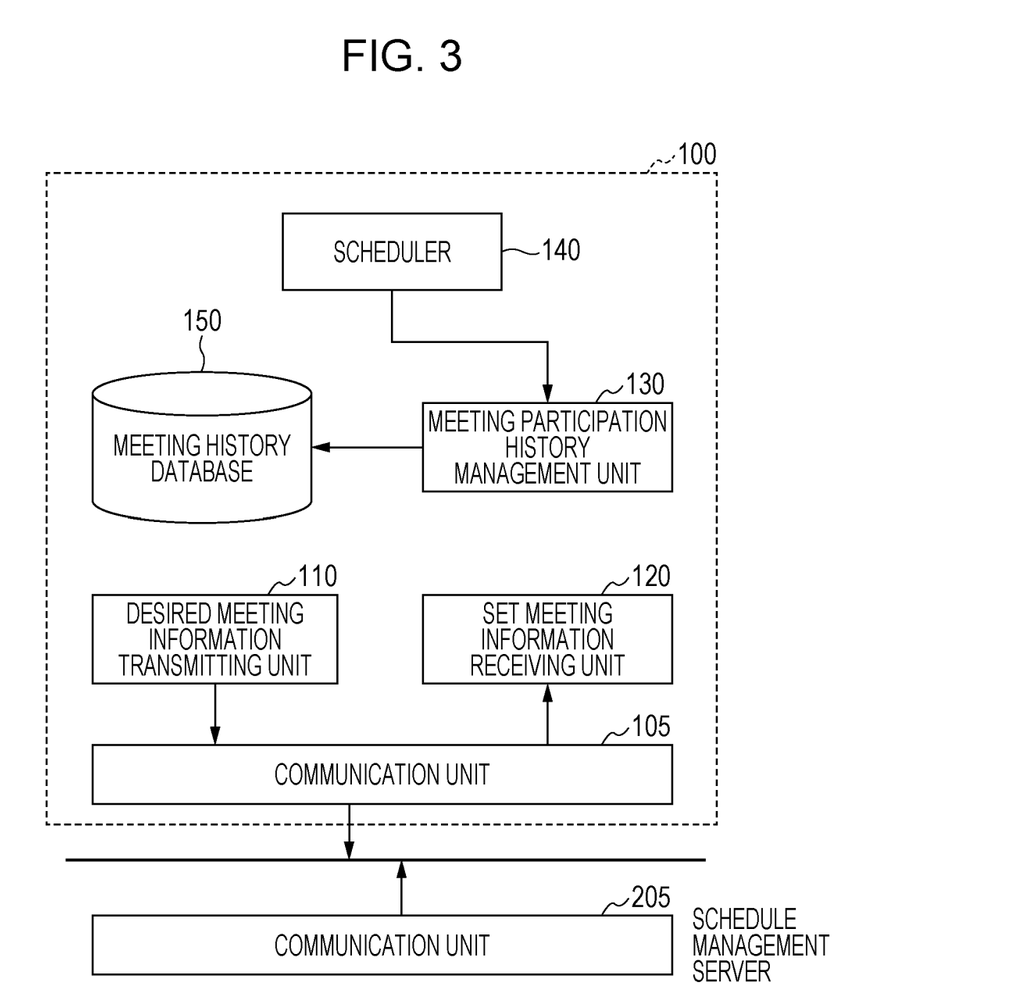
FIG. 3 illustrates a configuration of the functional blocks of a client device.
Figure 4:
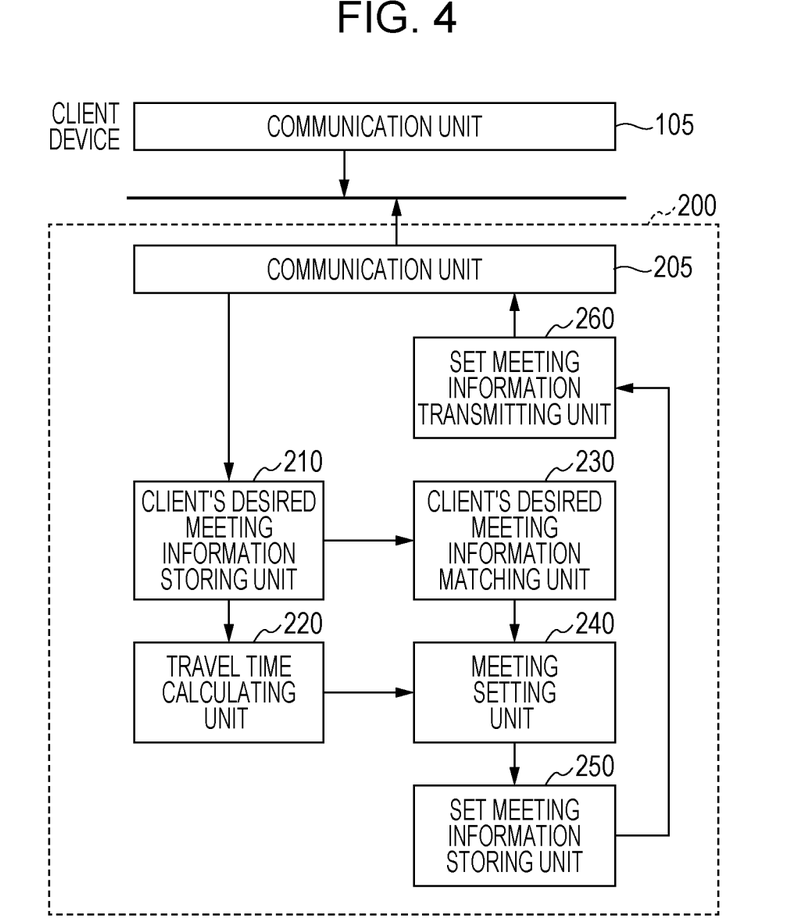
FIG. 4 illustrates a configuration of the functional blocks of a schedule management server apparatus.

FIG. 3 illustrates a configuration of the functional blocks of the client device 100. FIG. 4 illustrates a configuration of the functional blocks of the schedule management server apparatus 200.

Hereinafter, a functional configuration of the schedule management system 1 is described with reference to the figures.

(2.1) Client Device

As illustrated in FIG. 3, each of the client devices 100 has the following functional blocks: a desired meeting information transmitting unit 110 that transmits first schedule information including the location, date/time, and time period of a meeting that is an example of an event, a set meeting information receiving unit 120, and a meeting participation history management unit 130.

Each of the client devices 100 has a schedule management tool 140 (to be referred to as scheduler 140 hereinafter) as an application. The scheduler 140 manages schedule information about the user of the client device 100. The scheduler 140 stores information including schedule information such as the date/time and location of an event scheduled for the user of the client device 100 and positional information of the user's home or workplace.

When the desired meeting information transmitting unit 110 receives an input of desired meeting information including a desired meeting date/time, a desired meeting location range, and meeting member candidates made from the user by using the operation input unit 104 of the client device 100, the desired meeting information transmitting unit 110 transmits the desired meeting information to the schedule management server apparatus 200.

The set meeting information receiving unit 120 receives information about a meeting automatically set by the schedule management server apparatus 200 (to be referred to as set meeting information hereinafter). This set meeting information is stored in a such a state that allows the set meeting information to be viewed on the scheduler 140.

The user of the client device 100 views and checks this set meeting information via the scheduler 140 and the display 106. This set meeting information may be received and stored as an e-mail.

When the user actually participates in a meeting automatically set by the schedule management server apparatus 200, the meeting participation history management unit 130 acquires information about the meeting (date/time, positional information of the location, positional information of the immediately previous scheduled activity (a departure point to the meeting), the distance traveled from the departure point to the meeting to the hosting place of the meeting, and members of the meeting) while using information stored on the scheduler 140, and stores the acquired data into a meeting history database 150.

(2.2) Schedule Management Server Apparatus

As illustrated in FIG. 4, the schedule management server apparatus 200 has the following functional blocks: a client's desired meeting information storing unit 210, a travel time calculating unit 220, a client's desired meeting information matching unit 230, a meeting setting unit 240, a set meeting information storing unit 250, and a set meeting information transmitting unit 260.

The client's desired meeting information storing unit 210 temporarily stores desired meeting information of each of the client devices 100 transmitted at appropriate times from the desired meeting information transmitting unit 110 of each of the client devices 100.

The travel time calculating unit 220 connects to the property search server 300, the address search server 400, and the station-to-station search server 500, and calculates travel time from positional information, date/time information, and time period information within the desired meeting information of each of the client devices 100, and station-to-station information based on information of a departure point to the meeting.

The property search server 300 searches for an office, a meeting room, or another such rental property from positional information entered in the desired meeting information of each of the client devices 100.

The address search server 400 searches for an address from positional information entered in the desired meeting information of each of the client devices 100.

The station-to-station search server 500 extracts the nearest station to the departure point, the nearest station to the destination, and the shortest travel route, on the basis of the desired date/time information and time period information of each of the client devices 100 and information in the address search server 400.

The client's desired meeting information matching unit 230 extracts, on the basis of desired meeting information temporarily stored in the client's desired meeting information storing unit 210, a group of client devices that match the desired meeting information with no overlap of desired meeting dates/times and desired meeting location ranges (to be referred to as matching client device group hereinafter), from among the client devices 100 that are meeting member candidates in the desired meeting information.

For the matching client device group extracted by the client's desired meeting information matching unit 230, the meeting setting unit 240 further performs mediation between the pieces of desired meeting information of multiple client devices 100 belonging to the matching client device group to finally set the meeting details.

The set meeting information storing unit 250 stores the final meeting date/time and location information set by the meeting setting unit 240 as set meeting information.

The set meeting information transmitting unit 260 transmits the set meeting information determined for the matching client device group to each of the client devices 100 belonging to the matching client device group.

(3) Operation of Schedule Management System

Figure 5:
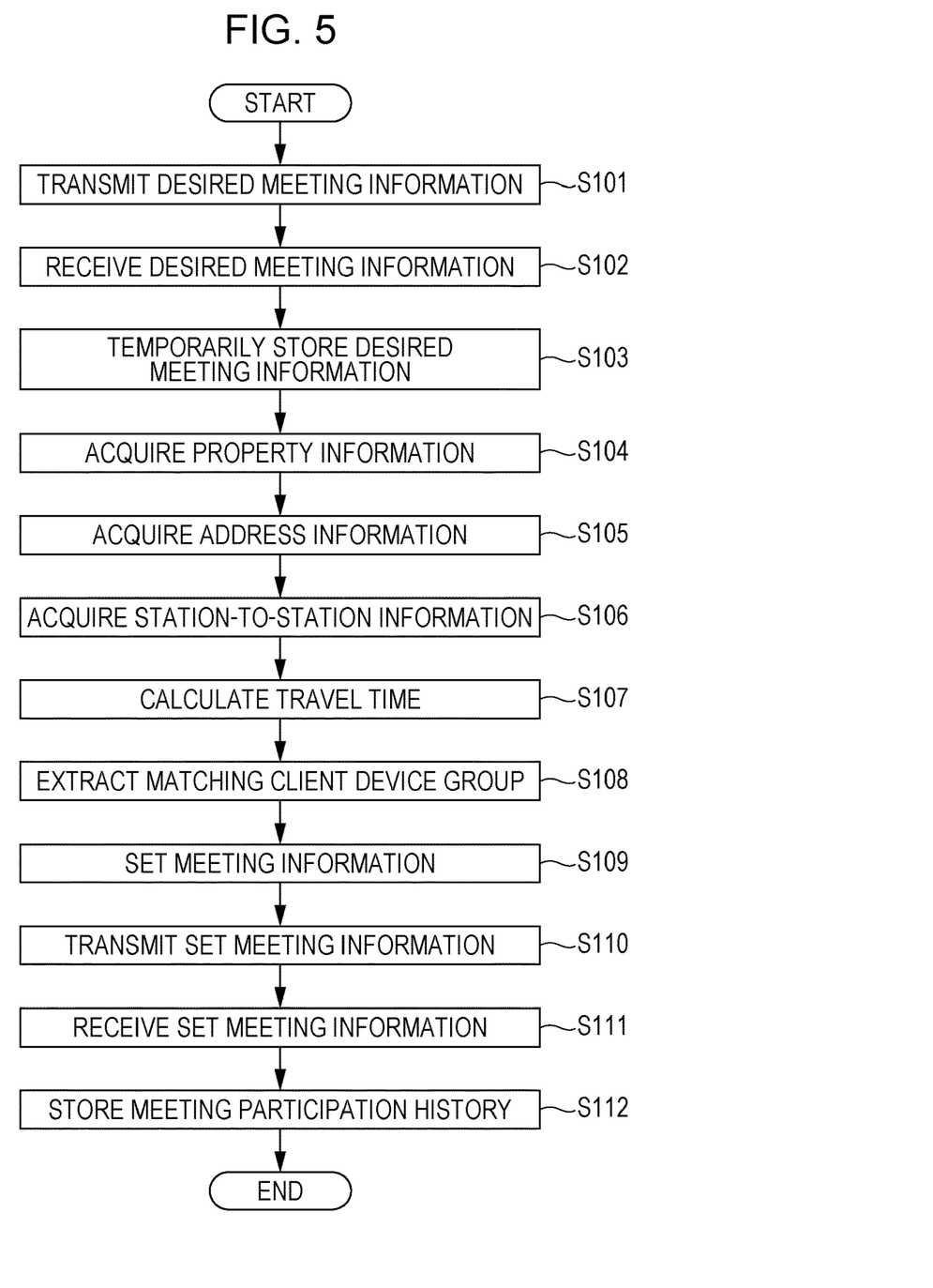
FIG. 5 is a flowchart illustrating a flow of operation of a schedule management system.

FIG. 5 is a flowchart illustrating a flow of operation of the schedule management system 1.

Hereinafter, operation of the schedule management system 1 according to the first exemplary embodiment is described in more detail.

The client device 100 transmits desired meeting information including a desired meeting date/time, a desired meeting location range, and meeting member candidates input via the operation input unit 104, to the schedule management server apparatus 200 from the desired meeting information transmitting unit 110 (S101).

The schedule management server apparatus 200 receives, by the communication unit 205, desired meeting information transmitted from each of the client devices 100 (S102). Then, the schedule management server apparatus 200 temporarily stores the received desired meeting information of each of the client devices 100 in the client's desired meeting information storing unit 210 (S103).

The schedule management server apparatus 200 transmits positional information entered in the desired meeting information of each of the client devices 100 to the property search server 300, and acquires office, meeting room, or other rental property information from the property search server 300 (S104).

Further, the schedule management server apparatus 200 transmits the positional information in the desired meeting information to the address search server 400, and acquires address information from the address search server 400 (S105).

The schedule management server apparatus 200 transmits the acquired address information, desired date/time information, and time period information to the station-to-station search server 500, and acquires station-to-station information from the station-to-station search server 500 (S106).

Then, the travel time calculating unit 220 calculates travel time on the basis of the acquired information (S107).

Subsequently, the schedule management server apparatus 200 performs a matching process by the client's desired meeting information matching unit 230. The matching process extracts a matching client device group that matches a desired meeting date/time and a desired meeting location range, from among meeting member candidates in the desired meeting information of each of the client devices 100 (S108).

The matching process is executed as follows. For example, first, for a given client device 100, other client devices 100 with the same desired meeting date are extracted. Then, from among these extracted client devices 100, only those other client devices 100 for which the desired meeting time (time period) overlaps that of the given client device 100 by a predetermined proportion or more (for example, 50% or more) are extracted, and further, those other client devices 100 for which the desired meeting location range overlaps that of the given client device 100 by a predetermined proportion or more (for example, 25% or more) are extracted.

Then, from the group of other client devices thus extracted, a group of client devices 100 with no overlapping client devices 100 is extracted as a matching client device group.

Next, for the matching client device group extracted by the client's desired meeting information matching unit 230, the meeting setting unit 240 of the schedule management server apparatus 200 further performs mediation between the pieces of desired meeting information of the client devices 100 belonging to the matching client device group on the basis of the travel time and route information calculated by the travel time calculating unit 220 to thereby finally set the meeting details (S109).

Then, the schedule management server apparatus 200 transmits information about the meeting date/time, the meeting location, and the shortest route finally determined, to each of the client devices 100 via the set meeting information transmitting unit 260 (S110).

In each of the client devices 100, the set meeting information receiving unit 120 receives the set meeting information automatically set by the schedule management server apparatus 200 (S111). This set meeting information is stored in such a state that allows the set meeting information to be viewed on the scheduler 140, thus allowing the user of the client device 100 to view and check the set meeting information via the scheduler 140 and the display 106.

When the user actually participates in a meeting that has been automatically set, the meeting participation history management unit 130 acquires information about the meeting while using information stored on the scheduler 140 as appropriate, and stores the acquired meeting information into the meeting history database 150 (S112).

Modifications

The schedule management server apparatus 200 stores information about the meeting date/time, the meeting location, and the shortest route finally determined, in the set meeting information storing unit 250 as meeting history information.

Further, the schedule management server apparatus 200 references meeting history information stored in the set meeting information storing unit 250, and distributes information about the meeting date/time, the meeting location, and the shortest route finally determined, to each of the client devices 100.

Second Exemplary Embodiment

Figure 6:
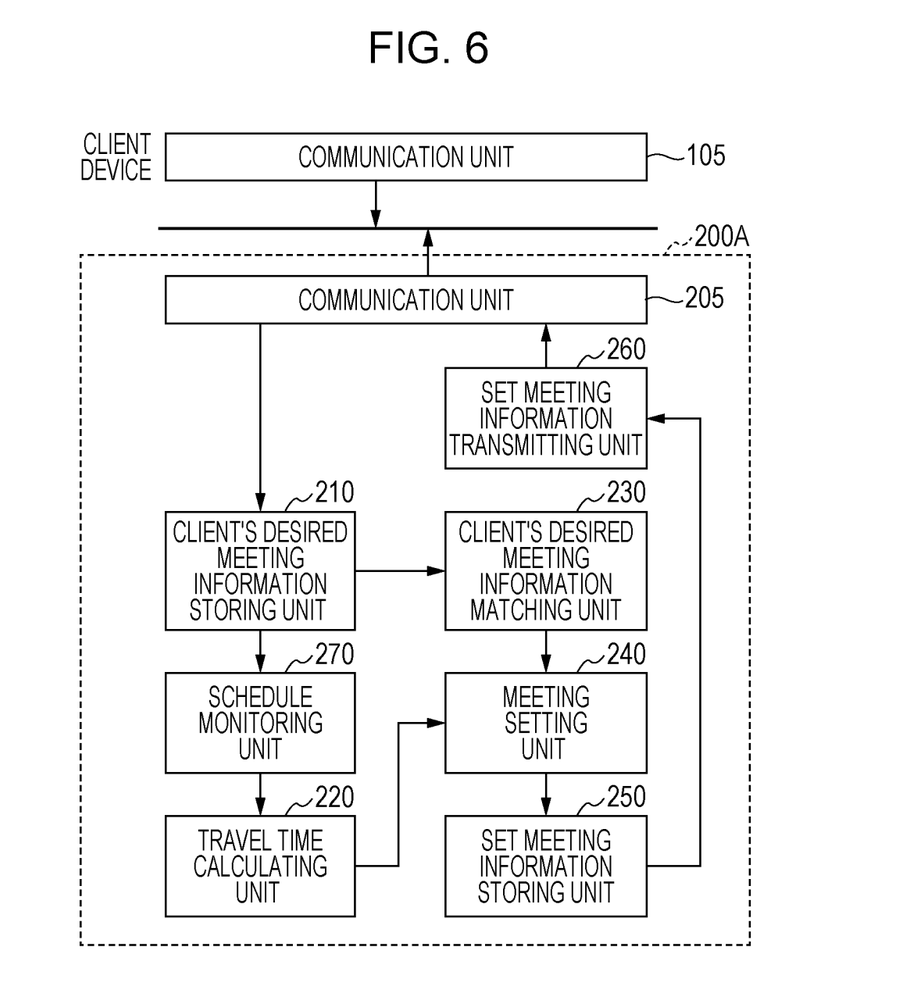
FIG. 6 illustrates a configuration of the functional blocks of a schedule management server apparatus.
Figure 7:
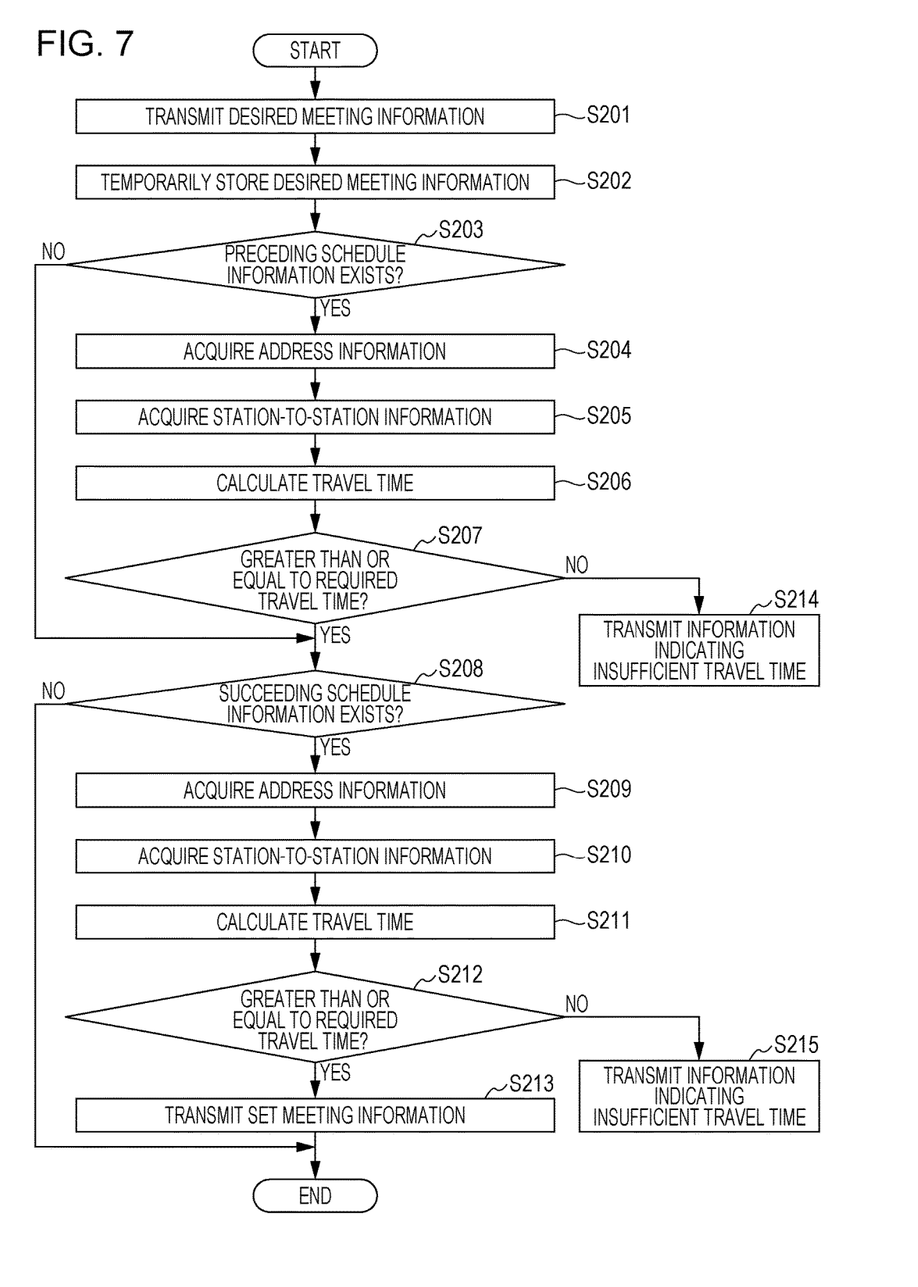
FIG. 7 is a flowchart illustrating a flow of operation of a schedule management server apparatus.

FIG. 6 illustrates a configuration of the functional blocks of a schedule management server apparatus 200A. FIG. 7 is a flowchart illustrating a flow of operation of the schedule management server apparatus 200A.

Hereinafter, operation of the schedule management server apparatus 200A according to a second exemplary embodiment is described in detail. It is to be noted that components common to those of the schedule management system 1 according to the first exemplary embodiment are denoted by the same reference signs, and a detailed description of those components is omitted.

The schedule management server apparatus 200A according to the second exemplary embodiment includes a schedule monitoring unit 270. The schedule monitoring unit 270 detects third schedule information corresponding to a time period that is on the same day as received first schedule information and precedes or follows the first schedule information.

The schedule management server apparatus 200A receives desired meeting information transmitted as first schedule information from each of the client devices 100 (S201), and temporarily stores the received information in the client's desired meeting information storing unit 210 (S202).

Then, the schedule management server apparatus 200A checks if, as third schedule information, schedule information that precedes the received desired meeting information in time exists (S203). If such schedule information exists (Yes at S203), the schedule management server apparatus 200A transmits positional information of this schedule information to the address search server 400, and acquires address information from the address search server 400 (S204).

The schedule management server apparatus 200A transmits positional information of the schedule information immediately preceding the first schedule information and positional information of the first schedule information to the station-to-station search server 500, and acquires station-to-station information from the station-to-station search server 500 (S205).

Then, the travel time calculating unit 220 calculates travel time on the basis of the acquired information (S206). The schedule monitoring unit 270 determines if the time between the start time of the first schedule information and the finish time of the immediately preceding schedule information is greater than or equal to a required travel time (S207).

If there is no problem with the travel time (Yes at S207), the schedule monitoring unit 270 checks if schedule information that follows the first schedule information in time exists (S208). If such schedule information exists (Yes at S208), the schedule management server apparatus 200A transmits positional information of this schedule information to the address search server 400, and acquires address information from the address search server 400 (S209).

The schedule management server apparatus 200A transmits positional information of the first schedule information and positional information of the immediately following schedule information to the station-to-station search server 500, and acquires station-to-station information from the station-to-station search server 500 (S210).

Then, the travel time calculating unit 220 calculates travel time on the basis of the acquired station-to-station information (S211).

The schedule monitoring unit 270 determines if the time between the start time of the immediately following schedule information and the finish time of the first schedule information is greater than or equal to a required travel time (S212). If there is no problem with the travel time (Yes at S212), the schedule monitoring unit 270 stores the immediately following schedule information into the set meeting information storing unit 250, and transmits information about the meeting date/time, the meeting location, and the shortest route finally set, to each of the client devices 100 via the set meeting information transmitting unit 260 (S213).

If it is determined at step S212 that there is not enough travel time (No at S212), information to that effect is transmitted to each of the client devices 100 via the set meeting information transmitting unit 260 (S214).

If it is determined at step S207 that there is not enough travel time (No at S207), information to that effect is transmitted to each of the client devices 100 via the set meeting information transmitting unit 260 (S215).

Third Exemplary Embodiment

Figure 8:
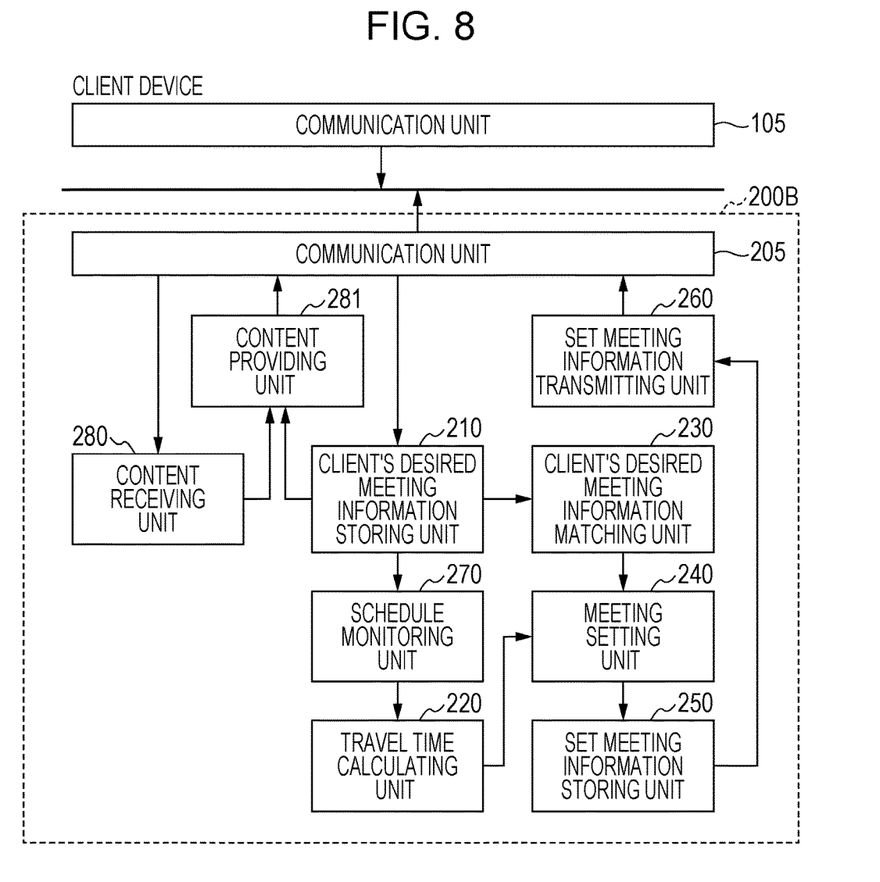
FIG. 8 illustrates a configuration of the functional blocks of a schedule management server apparatus.

FIG. 8 illustrates a configuration of the functional blocks of a schedule management server apparatus 200B.

Hereinafter, operation of the schedule management server apparatus 200B according to a third exemplary embodiment is described in detail. It is to be noted that components common to those of the schedule management system 1 according to the first exemplary embodiment are denoted by the same reference signs, and a detailed description of those components is omitted.

The schedule management server apparatus 200B according to the third exemplary embodiment includes a content receiving unit 280 and a content providing unit 281. The content receiving unit 280 receives content from a provider that provides information of the location of a meeting, and content from a provider that provides information of the nearest station to the departure point, the nearest station to the destination, and the shortest travel route. The content providing unit 281 distributes each of these pieces of content to each of the client devices 100 at a timing based on a preset schedule.

Examples of content provided by a provider that provides information of the location of a meeting include an advertisement image/picture. The content receiving unit 280 receives an advertisement image/picture from the property search server 300 that is connected, and saves the advertisement image/picture on the HDD 206.

Further, as for an advertisement image/picture as an example of content provided by a provider that provides information of the nearest station to the departure point, the nearest station to the destination, and the shortest travel route, such an advertisement image/picture is received from the station-to-station search server 500 and saves on the HDD 206.

The content providing unit 281 determines the content to be distributed to each of the client devices 100 and its distribution schedule, on the basis of desired meeting information temporarily stored in the client's desired meeting information storing unit 210.

Specifically, for example, the content providing unit 281 selects advertisement information that matches a desired meeting location range and the shortest route information, and distributes the selected advertisement information to each of the client devices 100. Each of the client devices 100 receives an advertisement distributed from the schedule management server apparatus 200B via the communication unit 105, and displays the received advertisement on the display 106.

Fourth Exemplary Embodiment

Figure 9:
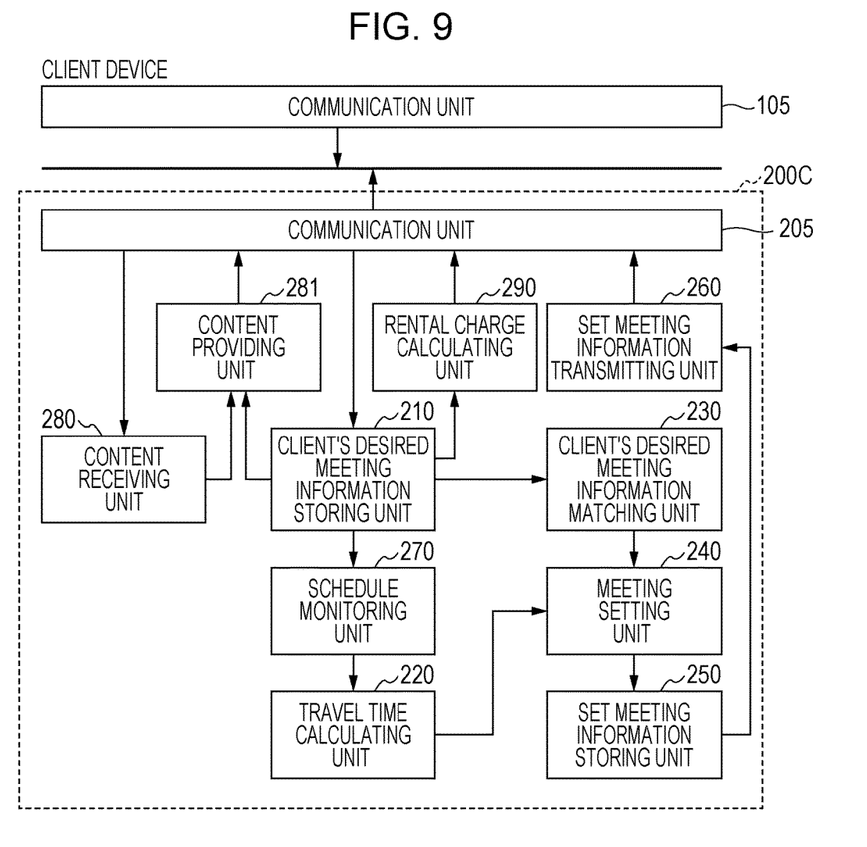
FIG. 9 illustrates a configuration of the functional blocks of a schedule management server apparatus.

FIG. 9 illustrates a configuration of the functional blocks of a schedule management server apparatus 200C.

Hereinafter, operation of the schedule management server apparatus 200C according to the fourth exemplary embodiment is described in more detail. It is to be noted that components common to those of the schedule management system 1 according to the first exemplary embodiment are denoted by the same reference signs, and a detailed description of those components is omitted.

The schedule management server apparatus 200C according to the fourth exemplary embodiment includes a rental charge calculating unit 290 that calculates the difference between the rental charge to be charged for newly renting a set event location on a single-use basis, and the rental charge to be charged for continuously renting the very same set event location.

The rental charge calculating unit 290 calculates the difference in charge on the basis of usage charge upper limit information about an event location set for each of the client devices 100, and the rental charge to be charged for continuously renting the very same set event location.

The usage charge upper limit information about an event location includes information such as equipment, depreciation, and energy costs for an office or building in which each of the client devices 100 is installed. The information about the rental charge for continuously renting the very same set event location is acquired from the property search server 300.

The difference in charge calculated by the rental charge calculating unit 290 is transmitted to each of the client devices 100. Each of the client devices 100 receives the difference in charge transmitted from the schedule management server apparatus 200C via the communication unit 105, and displays the difference on the display 106.

Figure 10:
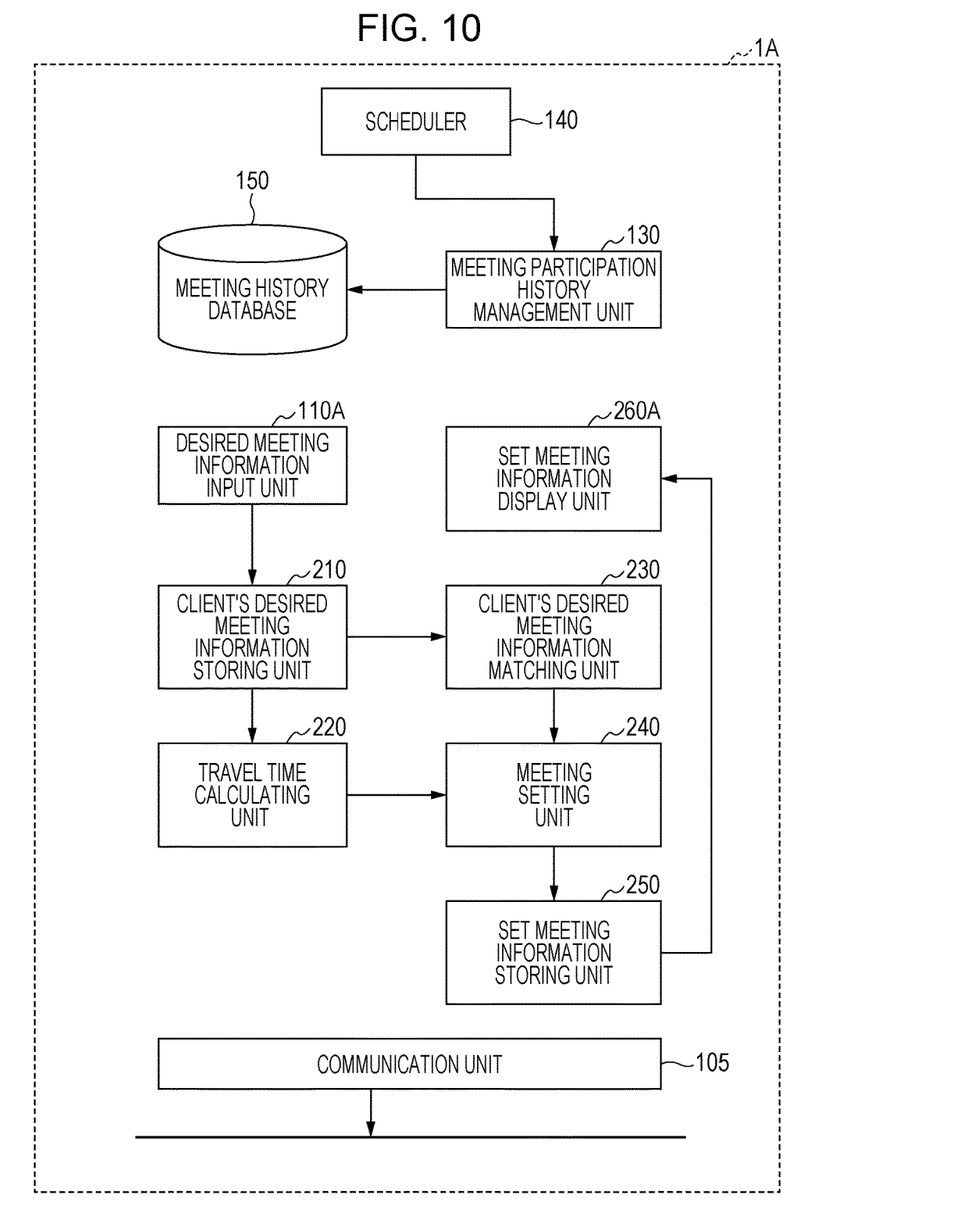
FIG. 10 illustrates a configuration of the functional blocks of a schedule management system in which the function of a schedule management server apparatus is built in a client device.

While the schedule management system 1 is herein implemented as a system in which the client devices 100 and the schedule management server apparatus 200 are connected to the network 600 and capable of communicating with each other, the schedule management system 1 may be implemented as a schedule management system 1A in which the function of the schedule management server apparatus 200 is built in each of the client devices 100.

As illustrated in FIG. 10, when a desired meeting information input unit 110A receives an input of a desired meeting date/time, a desired meeting location range, and meeting member candidates, the schedule management system 1A temporarily stores desired meeting information of each of the client devices 100 in the client's desired meeting information storing unit 210.

Then, a set meeting information display unit 260A displays set meeting information determined for a matching client device group, on the display 106 of each of the client devices 100.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A schedule management apparatus comprising:
a processor configured to act as:
a schedule information receiving unit that receives schedule information generated by each of a plurality of client devices, the schedule information including a description of an event, a location of the event, and a date/time of the event, wherein on a basis of the schedule information received by the schedule information receiving unit, the processor is configured to assess to determine an event to be newly added that matches schedule information across the plurality of client devices, the assessing to determine the event further including a determination as to whether schedule information in others of the plurality of client devices overlap the schedule information in one of the plurality of client devices by a predetermined portion or more with respect to the date/time of the event, and with respect to a location of the event, the others of the plurality of devices being selected as selected ones of the plurality of the devices when it is determined that the schedule information of the others of the plurality of devices overlaps the scheduled information in the one of the plurality of client devices by a predetermined proportion or more with respect to the date/time of the event and the location of the event, the predetermined proportion or more with respect to the date/time of the event being 50% or more, and wherein information is displayed on each of the selected plurality of client devices and the one of the plurality of devices about the event to be newly added that matches the schedule information without overlapping with a date/time of each of events scheduled before and after the event, the information representing at least one of a duration of the event, a location of the event, and a route to the event.

2. The schedule management apparatus according to claim 1, wherein:

the duration of the event, the location of the event, and the route to the event are generated by referencing published information published on an Internet, departure point address information, address information of the location as a destination, and mode-of-travel information, the published information being information of an office, a meeting room, or another rental property managed by a rental service provider to provide a rental service.

3. The schedule management apparatus according to claim 1, further comprising:

a memory that stores event history information, the event history information including date/time history information, location history information, and member history information about an event that is previously set, wherein a set event date/time and a set event location are displayed by referencing the stored event history information.

4. The schedule management apparatus according to claim 2, further comprising:

a memory that stores event history information, the event history information including date/time history information, location history information, and member history information about an event that is previously set, wherein a set event date/time and a set event location are displayed by referencing the stored event history information.

5. The schedule management apparatus according to claim 2, wherein the processor is further configured to act as:

a content receiving unit that receives at least one of content from a provider that provides the location of the event and content from a provider that provides the mode-of-travel information, wherein the received content is displayed at a timing based on a preset schedule.

6. The schedule management apparatus according to claim 1, wherein on a basis of usage charge upper limit information about an event location set for each of the plurality of client devices, and a rental charge to be charged for continuously renting the event location, a difference between a rental charge to be charged for newly renting the event location on a single-use basis and the rental charge to be charged for continuously renting the event location is displayed.

7. A non-transitory computer readable medium storing a program causing a computer to execute a process for managing a schedule, the process comprising:

receiving schedule information generated by each of a plurality of client devices, the schedule information including a description of an event, a location of the event, and a date/time of the event; and on a basis of the received schedule information, assessing so as to determine an event to be newly added that matches schedule information across the plurality of client devices, the assessing to determine the event further including a determination as to whether schedule information in others of the plurality of client devices overlap the schedule information in one of the plurality of client devices by a predetermined portion or more with respect to the date/time of the event, and with respect to a location of the event, the others of the plurality of devices being selected as selected ones of the plurality of the devices when it is determined that the schedule information of the others of the plurality of devices overlaps the scheduled information in the one of the plurality of client devices by a predetermined proportion or more with respect to the date/time of the event and the location of the event, the predetermined portion or more with respect to the date/time of the event being 50% or more; and displaying information on each of the selected plurality of client devices and the one of the plurality of devices about an event to be newly added that matches the schedule information without overlapping with a date/time of each of events scheduled before and after the event, the information representing at least one of a duration of the event, a location of the event, and a route to the event.

8. An information management method comprising:

receiving schedule information generated by each of a plurality of client devices, the schedule information including a description of an event, a location of the event, and a date/time of the event; and on a basis of the received schedule information, assessing so as to determine an event to be newly added that matches schedule information across the plurality of client devices, the assessing to determine the event further including a determination as to whether schedule information in others of the plurality of client devices overlap the schedule information in one of the plurality of client devices by a predetermined portion or more with respect to the date/time of the event, and with respect to a location of the event, the others of the plurality of devices being selected as selected ones of the plurality of the devices when it is determined that the schedule information of the others of the plurality of devices overlaps the scheduled information in the one of the plurality of client devices by a predetermined proportion or more with respect to the date/time of the event and the location of the event, the predetermined proportion or more with respect to the date/time of the event or more being 50% or more; and displaying information on each of the selected plurality of client devices and the one of the plurality of devices about an event to be newly added that matches the schedule information without overlapping with a date/time of each of events scheduled before and after the event, the information representing at least one of a duration of the event, a location of the event, and a route to the event.

* * * * *